United States Patent [19]
Felton et al.

[11] 4,176,865
[45] Dec. 4, 1979

[54] COUPLING FOR PIPE

[75] Inventors: Dale D. Felton, Anchorage, Ak.; William R. Jones, Springboro, Ohio

[73] Assignee: Armco Steel Corporation, Middletown, Ohio

[21] Appl. No.: 888,537

[22] Filed: Mar. 21, 1978

[51] Int. Cl.² ............................................. F16L 21/06
[52] U.S. Cl. ............................. 285/373; 285/DIG. 4
[58] Field of Search ................. 285/373, 419, DIG. 4, 285/233

[56] References Cited

U.S. PATENT DOCUMENTS

| | | | |
|---|---|---|---|
| 2,778,661 | 1/1957 | Leighton | 285/373 X |
| 3,154,328 | 10/1964 | Masse | 285/233 |
| 3,501,179 | 3/1970 | Boynton et al. | 285/373 |
| 3,776,579 | 12/1973 | Gale | 285/373 X |
| 4,124,236 | 11/1978 | Guidry | 285/DIG. 4 X |

FOREIGN PATENT DOCUMENTS

| | | | |
|---|---|---|---|
| 2321315 | 3/1975 | Fed. Rep. of Germany | 285/373 |
| 951003 | 3/1964 | United Kingdom | 285/233 |

*Primary Examiner*—Thomas F. Callaghan
*Attorney, Agent, or Firm*—Frost & Jacobs

[57] ABSTRACT

Improved coupling means for pipe to provide a leak tight joint between abutting pipe sections. Each pipe section is provided with at least one annular, circumferentially continuous depression at each end thereof, the outside of the exterior surface in which said depression is formed providing continuous surface-to-surface seal with the coupling means about the entire circumference of the abutting pipe sections to be joined. The coupling means includes a first band encircling the adjacent ends of the pipe sections with the free ends thereof overlapping. A second band overlies and encircles the first band and means are provided for tensioning the ends of the second band together.

29 Claims, 13 Drawing Figures

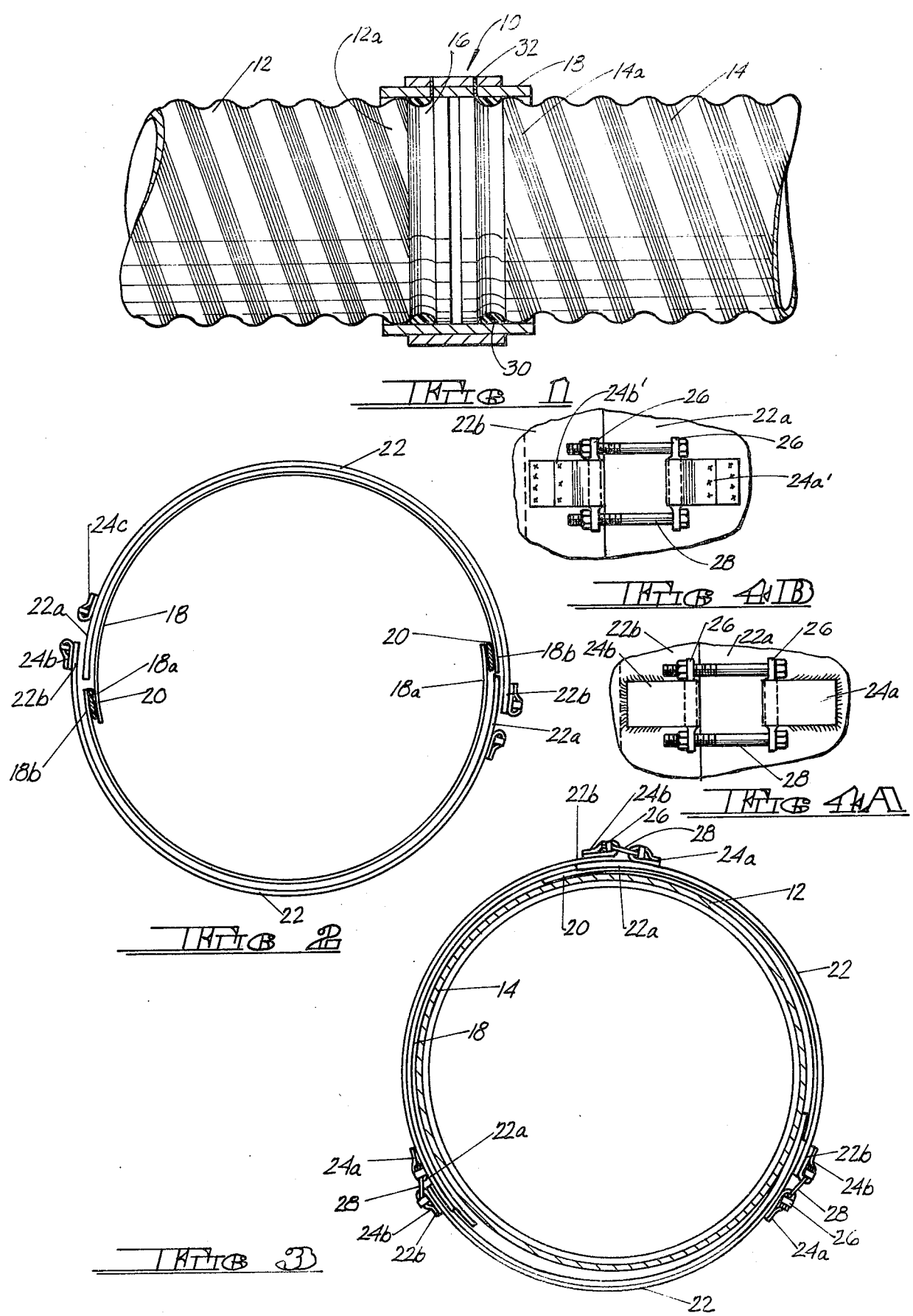

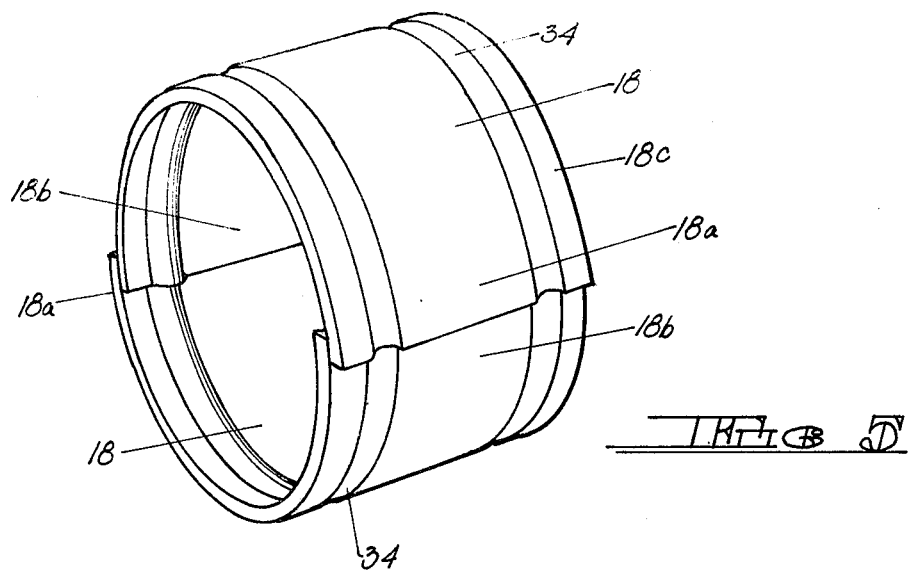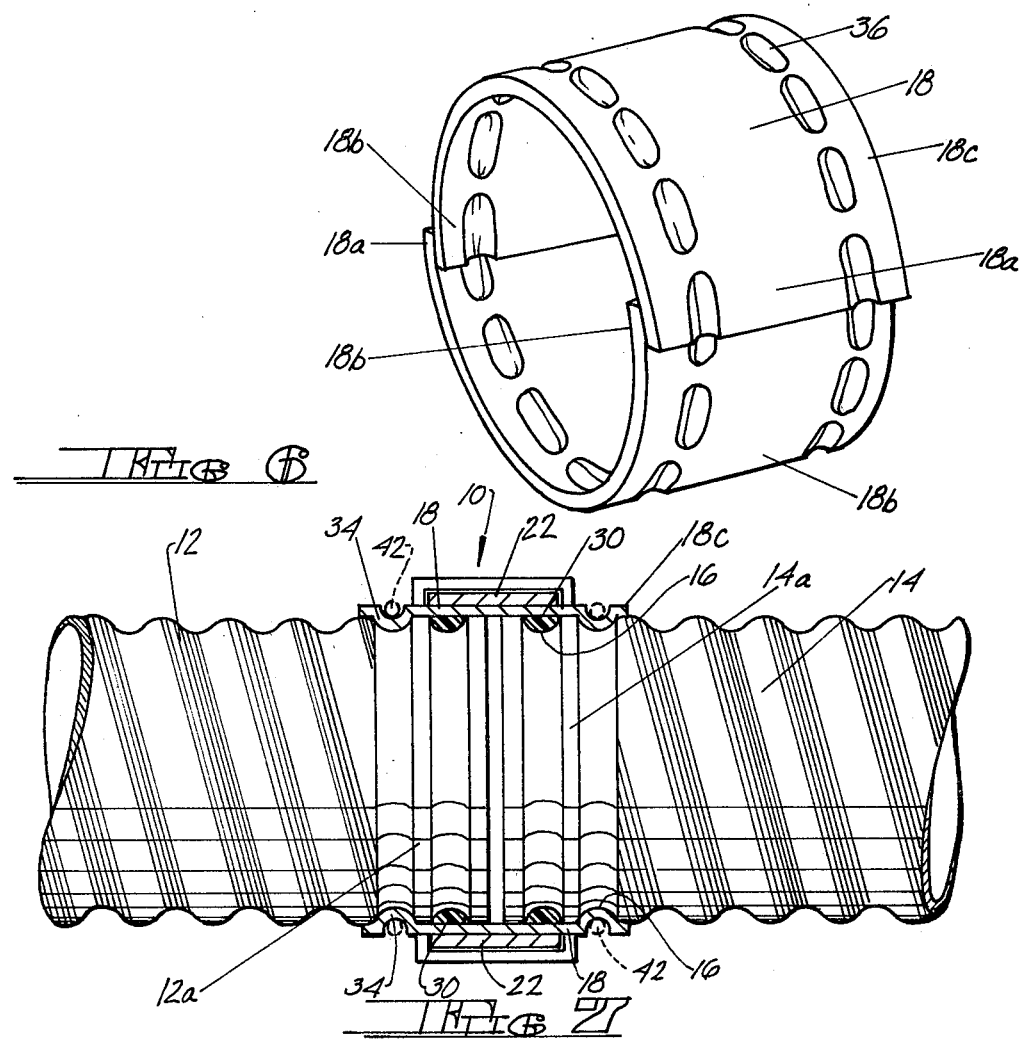

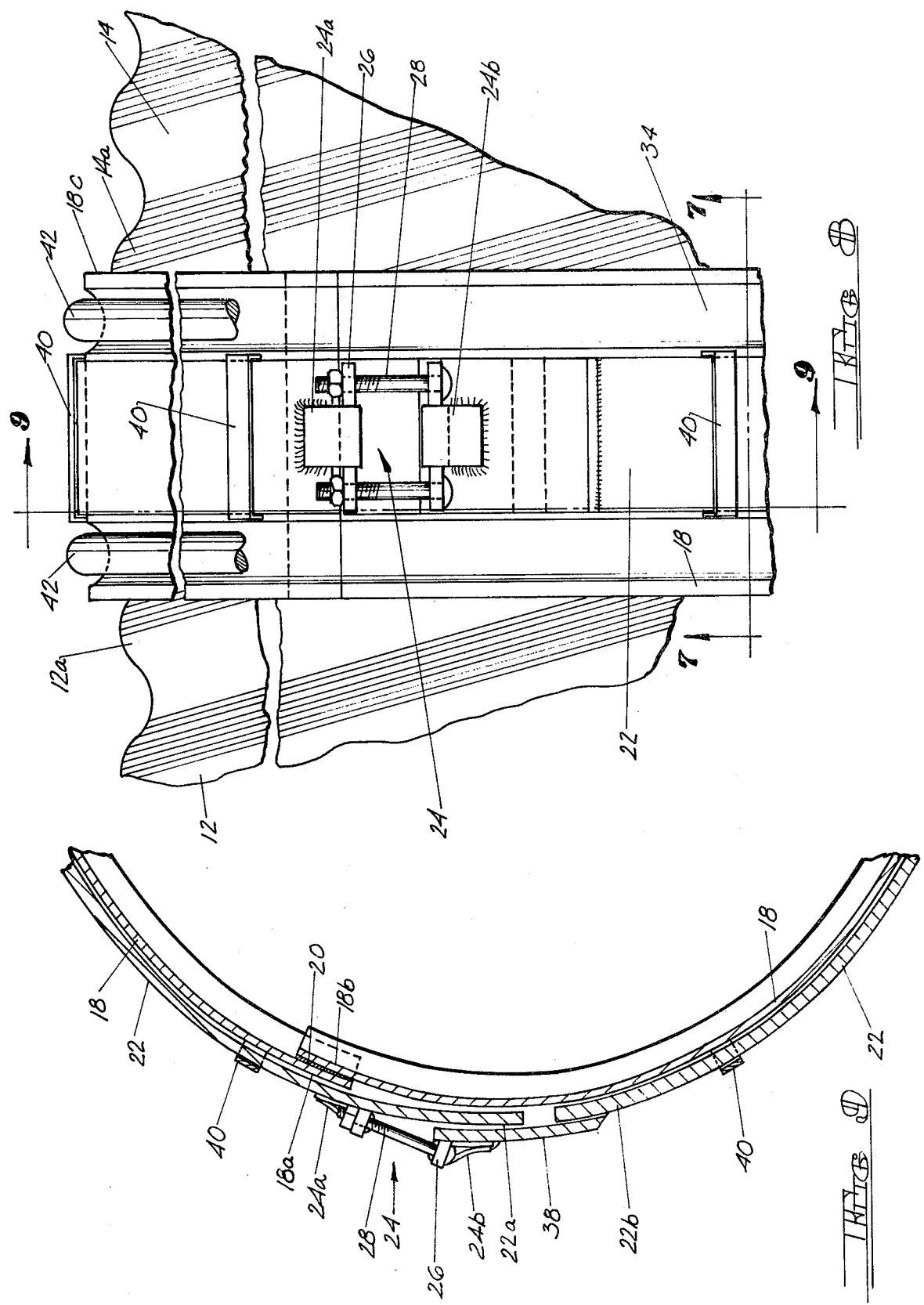

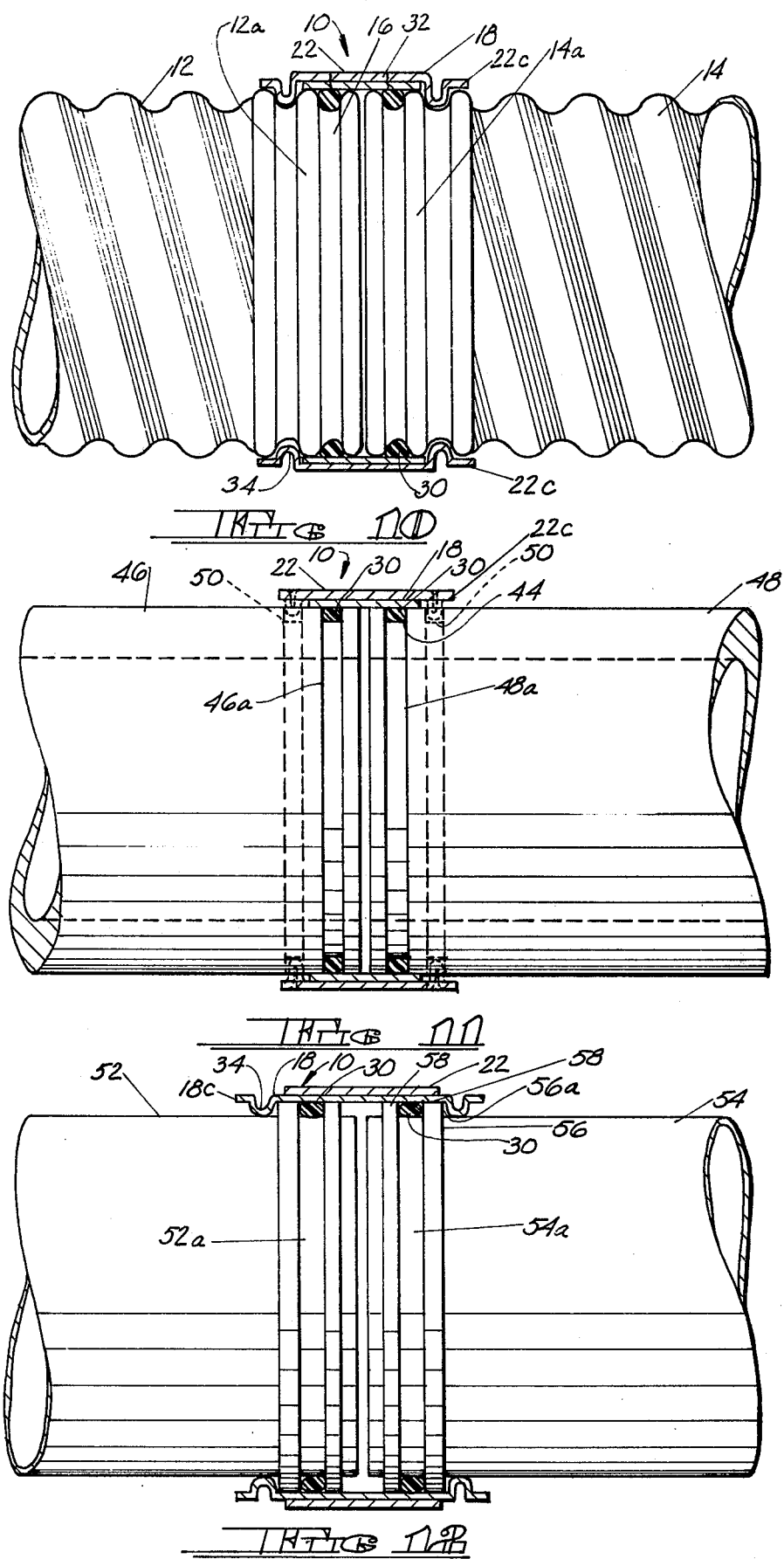

COUPLING FOR PIPE

BACKGROUND OF THE INVENTION

1. Field of the Invention

The invention relates to pipe couplings, and more particularly, to couplings of the type used to join abutting sections of pipe.

2. Description of the Prior Art

Basic couplings for joining thin walled pipe sections and thick walled pipe sections for high pressure applications, working pressures up to 100 psi, have generally proven to be unsatisfactory, since such couplings require specialized fabrication and the like. Exemplary of such problems are the myriad problems incurred with couplings for helically corrugated pipe section application.

The use of helically corrugated, spiral pipe has increased, due to the myraid new applications and modifications which have been developed. However, basic couplings for joining such pipe sections have generally proven to be unsatisfactory, with the sole exception of the coupling disclosed by U.S. Pat. No. 3,501,179, in the name of Jerald H. Boynton, et al.

In joining adjacent sections of helically corrugated, spiral pipe, the prior art has found that the corrugations of the pipe sections to be joined and the corrugations of the band-type coupling means must all be of substantially the same pitch, size and depth. Furthermore, these corrugations must be aligned so that the band can properly seat on the pipe section ends. In order to achieve this end, often one of the pipe sections must be revolved about its axis, or longitudinal movement of one pipe section with respect to the other pipe section is required. Rotational movement of one pipe with respect to the other pipe is very time consuming and not practical, or cannot be tolerated if the pipe is of large diameter or is either paved in the bottom or noncircular in cross section, such as a pipe arch. Longitudinal movement of one pipe with respect to the other pipe has also proven to be impractical because the gap between the ends of the two pipe sections could become critical as a large diameter pipe is moved longitudinally. Accordingly, the coupling must necessarily carry all of the load across the pipe.

Various prior art couplings have been utilized to join helically corrugated spiral pipe, but they have generally proven to be unsatisfactory, with the sole exception of the coupling disclosed in U.S. Pat. No. 3,501,179, which provides a pipe joint comprising a pair of substantially axially aligned, abutting lengths of butt welded, helically corrugated, spiral pipe, the abutting ends of each pipe being provided with at least one annular corrugation. The outside diameter of each annular corrugation is substantially identical with the maximum outside diameter of its helically corrugated pipe length. A coupling band encircles the adjacent ends of the lengths of pipe and means are provided for tensioning the ends of the band together. The band has a predominately flat cross section and is of a width to provide a continuous surface-to-surface seal about the entire circumference of each abutting length of pipe at at least two points thereon. The Boynton, et al, pipe joint is easily assembled without rotating one of the abutting sections, and the band may be satisfactorily positioned substantially abutting the pipe sections because the distance between the annular corrugations is constant regardless of orientation and equals the distance between deformations on the band. The annular corrugations allow more play in the pipe joint when the ends of the band are tensioned together and provide enhanced separation resistance and generally reinforce the pipe ends against damage. Such a pipe joint eliminate the myriad problems previously present in joining helically corrugated paved pipe or deformed pipe as well as the problems created by the substantial gap between the abutting ends. However, while the Boynton, et al, pipe joint proved satisfactory for most applications of helically corrugated spiral pipe, which required that the pipe be soil tight and convey water without gross leakage, i.e., that the pipe will not necessarily be watertight but nevertheless must not permit water to leak or flow through a joint at such a volume and velocity as to cause undue settling or erosion of the soil surrounding the pipe, it has proven unsatisfactory as a coupling to carry high pressures to be encountered in water transmission in helically corrugated spiral pipe. In fact, there are no present satisfactory uses of helically corrugated spiral pipe in high pressure applications, working pressures of up to 100 psi, because a satisfactory coupling for joining sections of butt welded, helically corrugated, spiral pipe has not been available.

SUMMARY OF THE PRESENT INVENTION

The present invention provides a pipe joint comprising two substantially axially aligned, abutting pipe sections and cooperating coupling means encircling the adjacent ends of the sections to provide a substantially leak-tight joint therebetween. Each pipe section is provided at each end thereof with at least one annular, circumferentially continuous, depression, the diameter of the exterior surface in which the depression is formed providing a continuous surface-to-surface seal with the coupling means about the entire circumference of the pipe.

The coupling means comprises a first band encircling the adjacent ends of the lengths of pipe. The first band is provided with a predominately flat cross section and is of a width to provide the continuous surface seal with the exterior surface in which said depressions are formed. The free ends of the first band are adapted to overlap each other. A second band overlies the outer surface of the first band. The second band also has a predominately flat cross section, and means are provided for tensioning the free ends of the second band together.

In practice the annular depression at each end of the abutting pipe sections may comprise an annular corrugation, a slot, or may be formed by a pair of spaced retainer rings.

The second band may be of a width less than or greater than the width of the first band. The band of greater width may be provided with at least one deformation near each of the adjacent, abutting ends of the pipe sections to be joined so that the pipe sections are precluded from pulling out of the coupling means. Each deformation may comprise one annular corrugation or a row of indentations.

A resilient sealing ring may be positioned in an annular corrugation on an abutting end of each of the pipes, contiguous with the underside of the first band when the ends of the second band are tensioned together.

The first band may include a plurality of segments the adjacent ends of which overlap. Additionally, the second band may be made up of one or more segments, one end of each segment being adapted to overlap or abutt the adjacent end of the adjacent segment, and means may be provided for tensioning the overlapped ends of the segments together.

In a further embodiment of the present invention one of the free ends of the second band may be provided with a forwardly extending plate adapted to overlie the other free end of the second band with the free ends of the second band being in substantial abutment after tensioning.

The overlying second band may be secured to the first band by welding, or inverted U-shaped retaining straps may be spaced about the periphery of the first band and the second band may be slidably received within the straps. In lieu of U-shaped retaining straps, aligned retaining means may be spaced about the periphery of the first band to maintain the second band in position thereabout. The means for tensioning the ends of the second band together or for tensioning the ends of the second band segments together may comprise a loop attached to each end of the band or band segments, each loop being provided with a bar member, and bolt means, the ends of said bolt means being received by said bar members.

The coupling means of the present invention provides a leak tight joint which may be utilized to carry high pressures to be encountered in water transmission in pipe. The coupling means is not bulky or difficult to handle and does not require substantial labor time for installation.

BRIEF DESCRIPTION OF THE DRAWINGS

FIG. 1 is a partial cross sectional view through the coupling of the present invention used to join two sections of butt welded, helically corrugated, spiral pipe, the ends of which are provided with annular corrugations.

FIG. 2 is an exploded plan view of the coupling of FIG. 1 showing the first and second bands.

FIG. 3 is a partial cross sectional view through a section of helically corrugated, spiral pipe showing the second band of the coupling as comprising three segments.

FIG. 4A is a partial plan view of the tension means for use in connecting the second band of the coupling of the present invention.

FIG. 4B is a view similar to FIG. 4A showing a further variation of the tension means.

FIG. 5 is a perspective view of a modification of the first band of the coupling of the present invention.

FIG. 6 is a view similar to FIG. 5 showing a further modification of the first band of the coupling of the present invention.

FIG. 7 is a partial cross sectional view taken on the line 7—7 of FIG. 8.

FIG. 8 is an enlarged detail of the coupling of the preferred embodiment of the present invention showing the tension means.

FIG. 9 is a cross sectional view taken on the line 9—9 of FIG. 8.

FIG. 10 is a view similar to FIG. 1 showing the outer band of greater width than the inner band.

FIG. 11 is a partial cross sectional view through the coupling of the present invention used to join two sections of smooth thick walled pipe showing the slots in the pipe ends.

FIG. 12 is a partial cross sectional view through the coupling of the present invention used to join the two sections of smooth, thin walled pipe showing a pair of spaced retainer rings around the abutting ends of each pipe.

BRIEF DESCRIPTION OF THE PREFERRED EMBODIMENTS

The coupling 10 of the present invention may be used to join any kind of pipe sections such as thin walled helically butt welded smooth wall or corrugated pipe, straight seam welded or seamless pipe, thick walled pipe, or any smooth walled pipe, i.e. seamless, spiral weld, plastic, etc.

Turning first to FIG. 1, the coupling 10 of the present invention is shown joining two substantially axially aligned, abutting pipe sections 12 and 14 of helically corrugated spiral pipe. The coupling means 10 encircles the adjacent ends 12a and 14a of the pipe sections 12 and 14, respectively, to provide a substantially leak tight joint therebetween. Each pipe section 12, 14 comprises a metallic, helically corrugated spiral pipe, the pipe being continuously butt welded on a helical angle such that the outside surface thereof across the weld is smooth and free from discontinuities. Each pipe section 12, 14 is provided at each end thereof with at least one annular, circumferentially continuous, depression, such as the annular corrugation 16, and the helical corrugations extend from the innermost one of the annular corrugations 16 on one end 12a, 14a of the pipe section 12, 14 to the innermost one of the annular corrugations 16 on the other end 12a, 14a of the pipe 12, 14. The outside diameter of each annular corrugation 16 is substantially identical with the outside diameter of the helically corrugated, spiral pipe, 12, 14, and the crests adjacent each annular corrugation 16 are adapted for sealing purposes and to provide a continuous surface-to-surface seal with the coupling means 10 about the entire circumference of the pipe sections 12, 14.

The annular corrugations 16 permit a much more efficient coupling. It will, of course, be understood that the concept of forming the ends of helically corrugated, spiral pipe to provide annular corrugations was not possible with the conventional lock seam, welded or not, because such a seam could not withstand the severe deformation required. However, with the advent of butt welded seam, such deformation was possible.

The coupling means 10 of the present invention comprises a first band 18 encircling the adjacent ends 12a, 14a of the lengths of pipe 12, 14, respectively. The first band 18 has a predominately flat cross section and is of a width to provide the continuous surface seals with the crests of the annular corrugations 16. As can be seen, the first band 18 is provided with a pair of free ends 18a, 18b adapted to overlap each other. As seen in FIGS. 2 and 3, the first band 18 may be made up of a plurality of segments the adjacent ends of which overlap. In practice a sealant 20 is placed in the overlap of adjacent ends of the first band 18. Such sealants are well known in the art; however, it has been found that a utyl base mastic tape identified as TC-40 and sold by Chemical Sealing Corporation, St. Louis, Missouri, obtains particularly good results.

The coupling means 10 also includes a second band 22 overlying the outer surface of the first band. The second band 22 effectively prevents the lap of the first band 18 from leaking when the first band 18 is subjected to pressure by precluding deformation at the lap. The second band 22 has a predominately flat cross section and may be of a width less than or greater than the width of the first band 18. Suitable tensioning means 24 are provided for tensioning the free ends 22a, 22b of the second band 22 together. As best seen in FIGS. 2 and 3, the second band 22 may be made up of a plurality of segments, one end 22a, 22b of each segment being adapted to overlap the adjacent end 22b, 22a, respectively, of the adjacent segment 22, and means 24 may be provided for tensioning the overlapped ends of the segments 22 together.

It should perhaps, be noted that the first band 18 is preferably of less gauge than the second band 22. However, it will be understood that the thickness of the bands 18 and 22 is a function of a number of variables, including the types of material, and that the bands 18 and 22 need not be of the same material.

The means 24 for tensioning the ends 22a, 22b of the second band or second band segments 22 together comprise at least one loop 24a and 24b attached to each end of the band 22 as best seen in FIG. 4A. The loops 24a and 24b are attached to the band 22 far enough from the ends 22a, 22b, thereof, respectively, so as to provide overlapping of the ends when the ends are tensioned together. A bar member 26 is located in each loop 24a, 24b and bolt means 28 join the bar members 26 together. The bolt means 28 are preferable when the ends of relatively small diameter butt welded, helically corrugated, spiral pipe are being joined. However, it will be understood that a further exemplary coupling could include a U-shaped bolt in lieu of one of the bar members 26. If small diameter pipes are being joined, the U-shaped bolt must be curved to conform therewith. In practice the bolt means 28 is preferably positioned such that the line of tension therein is close to the surface of the second band 22 when the ends 22a, 22b thereof are tensioned together. This precludes the second band 22 from raising off the first band 18 and precludes the first band 18 from raising off the abutting pipes 12, 14 beneath the bolt means 28.

It will be seen that the loops 24a and 24b of the tensioning means shown in FIG. 4A have the terminal substantially aligned. However, if desired the upper terminal edge of the loops 24a' and 24b' of the tensioning means shown in FIG. 4B are offset back from the lower edge thereof. If additional strength is required, the loops may be arc welded as shown in FIG. 4A rather than tack welded as shown in FIG. 4B.

Water tightness of the coupling means 10 is maintained by use of the resilient rings 30. The rings 30 are such that they stretch around the end of the spiral pipe 12, 14 and fit within one of the annular corrugations 16. When the ends 22a, 22b of the second band 22 are tensioned together, the resilient rings 30 are such that they will not extrude out of their corrugations and such that they are contiguous with the inner surface of the first band 18.

It should, perhaps, be noted hat while it is suggested that only one tensioning means 24 is required for tensioning the ends 22a, 22b of the second band or second segments 22 together, circumstances could dictate the use of more such tensioning means 24. For example, when higher pressure applications and/or larger diameter pipe 12, 14 are utilized, two or more tensioning means 24 may be required. This would, of course, necessitate using a wider second or outer band 22. Additionally, in those situations where corrugations 34 and tension cables 42 are required to prevent the abutting pipe ends from pulling apart, multiple tensioning means 24 may be used instead.

The resilient rings 30 are large enough in cross sectional configuration so that they extend above the surface of the pipes 12 and 14 and are small enough in cross sectional configuration so that a continuous surface-to-surface seal is provided about the entire circumference of each abutting end 12a, 14a of the pipes 12 and 14, respectively, at least two points thereon when the ends 22a, 22b of the second band 22 are tensioned together. The resilient rings 30 are preferably soft rubber O-rings, for example, rubber having a durometer number ranging from 20 to 60 Shore A, and the compression therein on the order of 15% to 50% will be substantially uniform about the entire circumference thereof. The hardness, cross section and percent compression are obviously interdependent. O-rings are also preferred for the resilient rings 30 because they are standard and non-complex, they offer no orientation problem, and they permit an increased shear transfer between the aforementioned surface-to-surface seal between the first band 18 and the pipes 12 and 14. However, other gasket shapes easily be adapted for this use.

As can best be seen in FIG. 1, the overlying second band 22 is secured to the first band 18, such as by spot welding 32. The welds 32 are not necessarily required, but they are desirable for ease of handling when multi segment bands are used.

It will, of course, be understood that the first and second bands 18 and 22, respectively may be one piece, or they may be segmented, as desired. For example, it has been found that the one-piece band is generally used for smaller diameter pipe, generally 24 inches in diameter or less.

It should also be noted that the overlap of the second band 22, as best seen in FIGS. 2 and 3, is usually restricted to lighter gauges, generally 14 gauge or less. This is so because, as will be explained more fully hereinafter, such overlap is found undesirable for the second band 22 for heavier gauge in that leaks can occur. For example, such leaks may result when the resilient rings 30 have insufficient resiliency to fill the void formed when the first band 18 yields from pressure into the overlap area of the outer band 22.

In practice the outer band 22 is preferably steel, as is the inner band 18. However, the inner band 18 could be made of any material such as, for example, rubber, FRP, etc. However, if the first and second bands 18 and 20 are secured together, such as by welding, the first or inner band 18 would have to be metal.

As previously indicated the second band 22 may be of a width less than or greater than the width of the first band 13. Turning now to FIGS. 5 and 6, it will be seen that when the second band 18 is of a width less than the first band 18, the first band 18 may be provided with at least one deformation near such circumferential edge 18c thereof which, as seen in FIGS. 7 & 8, engages a depression such as an annular corrugation 16 on each of the adjacent, abutting ends 12a, 14a of the pipe sections 12, 14, respectively, so that the pipe sections 12, 14 are precluded from pulling out of the coupling means 10. The deformation may comprise an annular corrugation 34 or indentations 36 which engage the trough of an annular corrugation 16 on the end 12a, 14a of one of the abutting pipes 12, 14 when the first band 18 is positioned therearound.

Similarly, if the second band 22 is of a width greater than the width of the first band 18, as best seen in FIGS. 10 and 11, the second band 22 may be provided with at least one deformation near each circumferential edge 22c thereof, which, as seen in FIG. 10, engages a depression such as an annular corrugation 16 on each of the aubtting ends 12a, 14a of the pipe sections 12, 14, respectively so that the pipe sections 12, 14 are precluded from pulling out of the coupling means 10. As previously indicated, the deformation may comprise an annular corrugation 34 or identations 36 which engage the depression such as the trough of an annular corrugation 16 on the end 12, 14 when the second band 22 is positioned therearound.

As can best be seen in FIGS. 7 and 10, the annular corrugations 34 of the first and second bands 18 and 22 preferably engage with the troughs of the innermost depression such as the corrugation 16 on the ends 12a, 14a of the butt welded, helically corrugated, spiral pipe 12 and 14. This precludes the pipes 12 and 14 from pulling out of the coupling means 10 after the ends 22a, 22b of the second band 22 have been tensioned together. It will, of course, be understood that if the first or second bands 18 and 22 are provided with deformations, such as the annular corrugations 34 or the indentations 36 near each circumferential edge 18c, 22c thereof, respectively, then two annular depressions such as corrugations 16 are required on each pipe end 12a, 14a, one corrugation 16 to receive the resilient ring 30 and one corrugation 16 to receive the corrugation 34 or indentation 36.

Turning now to the embodiment of the coupling means 10 as shown in FIGS. 7 through 9, it will be seen that one of the free ends 22b of the second band 22 is provided with a forwardly extending plate 38 adapted to overlie the other free end 22a of the second band 22, with the free ends 22a, 22b of the second band 22 being in substantial abutment. As has been previously explained, in practice it has been found that the overlap of the free ends 22a, 33b of the second band 22 is undesirable for heavier gauge, in that leaks can occur when the resilient rings 30 have insufficient resiliency to fill the void formed when the first or inner band yields from pressure into the overlap area of the second or outer band 22. Accordingly, this problem has been eliminated by the forwardly extending plate 38, which does away with the overlapping joint in the second or outer band 22.

When the forwardly extending plate 38 is utilized, the tensioning means 24 for tensioning the ends of the second or outer band 22 together may comprise a loop 24a, 24a', 24b and 24b' attached to one end 22b of the second band 22 and to the forwardly extending plate overlying the other end 22a of the second band 22, with each loop 24a, 24a' and 24b, 24b' being provided with a bar member 26, and bolt means 28, the ends of said bolt means 28 being received by said bar members.

As previously indicated, the overlying second band 22 may be secured to the first or inner band 18, such as by welding. However, in the embodiment of FIGS. 7 through 9, inverted U-shaped retaining straps 40 are secured to and spaced about the periphery of the first band 18. The second band 22 is slidably received within the straps 40.

It will, of course, be understood that other retaining means may be substituted for the U-shaped retaining straps 40.

Finally, it will be noted that the coupling means embodiment of FIGS. 7 through 8 is provided with additional strength and restraint to prevent the ends 12a, 14a of the pipe sections 12 and 14, respectively, from pulling apart by the tension cables 42 which are provided in one of the annular corrugations 34 of the first band 18. It will, of course, be understood that the tension cables 42 may only be utilized when corrugations 34 are provided on the edges 18c, 22c of the first or second bands 18 and 22, respectively.

As previously indicated, the pipe coupling 10 may be used to join any kind of pipe sections. In FIGS. 1 through 10, the coupling 10 was shown and described in terms of joining abutting sections of helically corrugated spiral pipe 12 and 14. However, it was explained that the annular depression at the end of the abutting pipe sections my comprise an annular corrugation, a slot, or it may be formed by a pair of spaced retainer rings. In this regard, it is pointed out that any thin walled helically butt welded, smooth wall or corrugated pipe, straight seam welded or seamless pipe could be used if at least one annular corrugation 16 is fabricated onto the pipe ends 12a, 14a. However, as best seen in FIG. 11, on thick walled pipe slots 44 may be machined into the pipe ends 46a, 48a of the abutting thick walled pipe sections 46 and 48, respectively. Additional slots 50 may be machined into the pipe sections 46 and 48 for preventing pull apart of the pipe ends 46a, 48a, respectively, if an annular corrugation 34 is provided on either the edges 18c or 22c of the first or second bands 18 or 22, respectively.

As best seen in FIG. 12, on any of the abutting smooth walled pipe sections 52, 54, i.e. seamless, spiral weld, plastic, etc., the annular depressions may be formed by a pair of spaced retainer rings 56 secured at the abutting ends 52a, 54a of the pipe sections 52, 54, respectively. Each retainer ring 56 is of substantially rectangular cross section so as to provide therewith a peripheral flat circumferential bearing surface 58 thereon for the continuous surface-to-surface seal with the coupling means 10. The first or inner band 18 of the coupling 10 rests on the surface 58 of the retainer rings 56 when the coupling means 10 is tightened. Since the primary seal is affected by the sealing member 30, the retainer rings 56 only need be intermittently secured to the pipe sections 52, 54, as, for example, by tack welding, if the pipe sections 52 and 54 are metallic. The pipe sections 52 and 54 may be prevented from pulling apart if an annular corrugation 34 is provided on either the edges 18c or 22c of the first or second bands 18 or 22, respectively, in which case the annular corrugations 34 are held by the outside surface 56a of the retainer rings 56.

While certain preferred embodiments of the invention have been specifically illustrated and described, it is understood that the invention is not limited thereto, as many variations will be apparent to those skilled in the art, and the invention is to be given its broadest interpretation within the terms of the following claims.

What we claim is:

1. A structure comprising, in combination, at least two substantially axially aligned, abutting pipe sections and cooperating coupling means encircling the adjacent ends of said sections to provide a substantially leak tight joint therebetween, each said pipe section being provided at each end thereof with at least one annular, circumferentially continuous, depression, the outside diameter of the exterior surface in which said depression is formed providing continuous surface-to-surface seal with said coupling means about the entire circumference of said pipe section, said coupling means comprising a first band encircling the adjacent ends of said lengths of pipe, said first band having a predominately flat cross section and being of a width to provide said continuous surface seal with the exterior surface in which said depressions are formed, said first band having a pair of free ends adapted to overlap each other, a second band overlying the outer surface of said first band, said second band having a predominately flat cross section, means for tensioning the free ends of said second band together, and a resilient sealing ring positioned in a depression on an abutting end of each of said pipes, said ring being such that it cannot extrude out of its depression and such that it is contiguous with the underside of said first band when the ends of said second band are tensioned together.

2. The structure according to claim 1, wherein each said depression comprises an annular corrugation, the crests adjacent each said annular corrugation being adapted for sealing purposes and providing said continuous surface-to-surface seal with said coupling means.

3. The structure according to claim 1, wherein each said depression comprises a slot.

4. The structure according to claim 1, wherein each said depression is formed by a pair of spaced retainer rings secured at the abutting ends of said pipe sections, each said retainer ring being of substantially rectangular cross section so as to provide therewith a peripheral flat circumferential bearing surface thereon for said continuous surface-to-surface seal with said coupling means.

5. The structure according to claim 1, wherein said second band is of a width less than the width of said first band and said first band is provided with at least one deformation near each circumferential edge thereof which engages an annular depression on each of the adjacent, abutting ends of said pipe sections so that said pipe sections are precluded from pulling out of said coupling means.

6. The structure according to claim 5, wherein said deformations engage the innermost annular depression on the ends of said pipe sections.

7. The structure according to claim 5, wherein each said deformation comprises one annular corrugation.

8. The structure according to claim 7, wherein a tension cable is provided in each of said corrugations to provide additional strength and restraint to prevent the ends of said pipe sections from pulling apart.

9. The structure according to claim 5, wherein each said deformation comprises one row of indentations.

10. The structure according to claim 5, wherein said means for tensioning the ends of said second band together comprise at least one loop attached to each end of said second band, each said loop being provided with a bar member, and bolt means, the ends of said bolt means being received by said bar members.

11. The structure according to claim 10, wherein said loops are attached to said second band far enough from the ends thereof so as to provide overlapping of said ends of said second band when the ends of said second band are tensioned together.

12. The structure according to claim 11, wherein the line of tension in said bolt means is close to the surface of said second band, whereby said first and second bands are precluded from raising off said pipe sections when the ends of said second band are tensioned together.

13. The structure according to claim 1, wherein said second band is of a width greater than the width of said first band and wherein said second band is provided with at least one deformation near each circumferential edge thereof which engages an annular depression on each of the adjacent, abutting ends of said pipe sections so that said pipe sections are precluded from pulling out of said coupling means.

14. The structure according to claim 13, wherein said deformation engages the innermost annular depression on the ends of said pipe sections.

15. The structure according to claim 13, wherein each said deformation comprises one annular corrugation.

16. The structure according to claim 13, wherein each said deformation comprises one row of indentations.

17. The structure according to claim 13, wherein said means for tensioning the ends of said second band together comprise a loop attached to each end of said second band, each said loop being provided with a bar member, and bolt means, the ends of said bolt means being received by said bar members.

18. The structure according to claim 17, wherein said loops are attached to said second band far enough from the ends thereof so as to provide overlapping of said ends of said second band when the ends of said second band are tensioned together.

19. The structure according to claim 18, wherein the line of tension in said bolt means is close to the surface of said second band, whereby said first and second bands are precluded from raising off said pipe sections when the ends of said second band are tensioned together.

20. The structure according to claim 1, wherein said first band is made up of a plurality of segments the adjacent ends of which overlap.

21. The structure according to claim 20, wherein a sealant is provided in the overlap of adjacent end of said first band segments.

22. The structure according to claim 1, wherein said second band is made up of at least two segments, one end of each segment being adapted to overlap the adjacent end of the adjacent segment, and means are provided for tensioning the overlapped ends of said segments together.

23. The structure according to claim 20, wherein said means for tensioning the ends of said second band segments together comprise at least one loop attached to each end of each said second band segment, each said loop being provided with a bar member, and bolt means, the ends of said bolt means being received by said bar members.

24. The structure according to claim 1, wherein a sealant is provided in the overlap of adjacent ends of said first band.

25. The structure according to claim 24, wherein said means for tensioning the ends of said second band together comprise a loop attached to one end of said second band and to said forwardly extending plate overlying the other end of said second band, each loop being provided with a bar member, and bolt means, the ends of said bolt means being received by said bar members.

26. The structure according to claim 1, wherein one of the free ends of said second band is provided with a forwardly extending plate adapted to overlie the other free end of said second band with the free ends of said second band being in substantial abutment after tensioning.

27. The structure according to claim 1, wherein said overlying second band is secured to said first band by welding.

28. The structure claimed in claim 1, wherein inverted U-shaped retaining straps are spaced about the periphery of said first band, said second band being slidably received within said straps.

29. The structure according to claim 1, wherein aligned retaining means are spaced about the periphery of said first band to maintain said second band in position thereabout.

* * * * *

UNITED STATES PATENT AND TRADEMARK OFFICE
CERTIFICATE OF CORRECTION

PATENT NO. : 4,176,865
DATED : December 4, 1979
INVENTOR(S) : Dale D. Felton and William R. Jones It is certified that error appears in the above-identified patent and that said Letters Patent are hereby corrected as shown below:

Title Page [73]

Assignee: Armco Steel Corporation,
Middletown, Ohio should read:

Assignee: Armco Inc.
Middletown, Ohio

Signed and Sealed this

Fifteenth Day of April 1980

[SEAL]

Attest:

SIDNEY A. DIAMOND

Attesting Officer

Commissioner of Patents and Trademarks